Dec. 27, 1960   R. E. FORRESTER ET AL   2,966,160
FLUID SENSING DEVICE
Filed Aug. 28, 1957   2 Sheets-Sheet 1
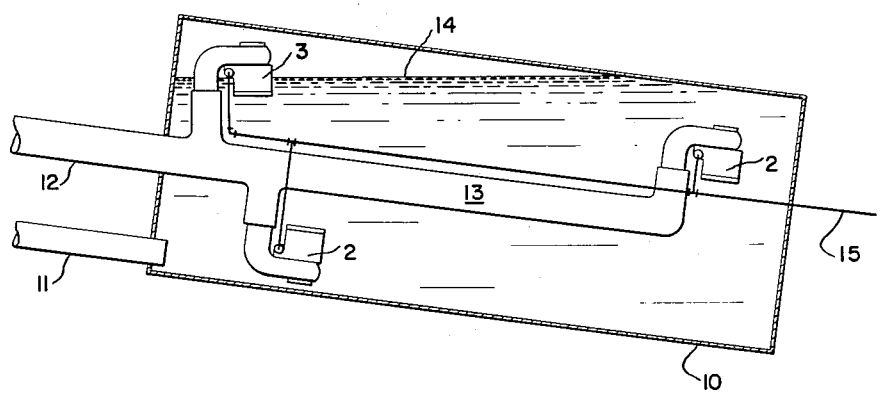
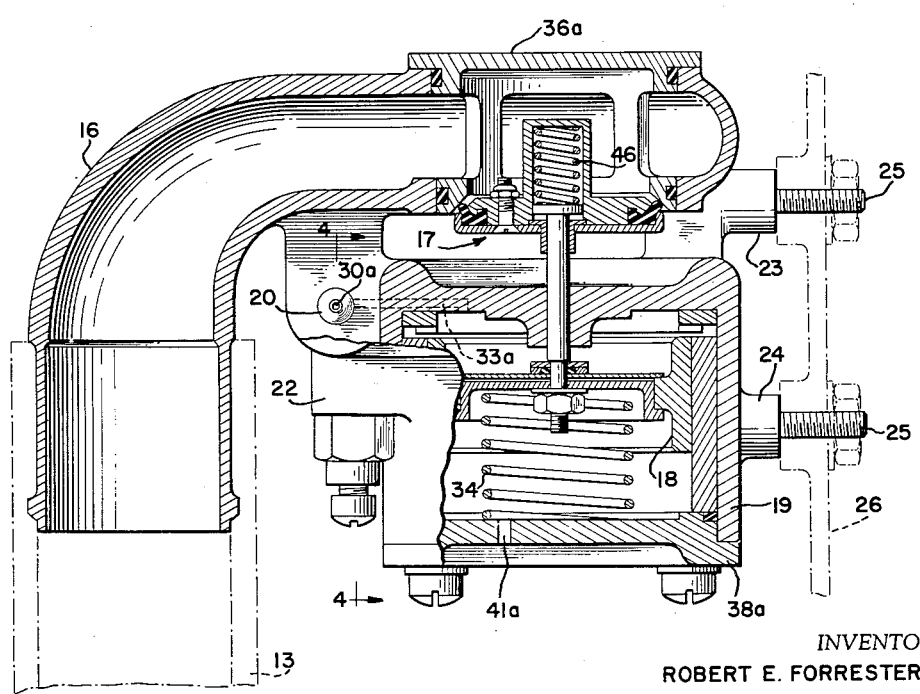
INVENTORS
ROBERT E. FORRESTER
FRANK K. STURGIS
BY Harmon & Pierce
ATTORNEYS Dec. 27, 1960   R. E. FORRESTER ET AL   2,966,160
FLUID SENSING DEVICE
Filed Aug. 28, 1957   2 Sheets-Sheet 2

INVENTORS
ROBERT E. FORRESTER
FRANK K. STURGIS

BY Harmon & Pierce

ATTORNEYS

United States Patent Office 2,966,160
Patented Dec. 27, 1960

2,966,160

FLUID SENSING DEVICE

Robert E. Forrester and Frank K. Sturgis, Corry, Pa., assignors to Aero Supply Manufacturing Co. Inc., Corry, Pa.

Filed Aug. 28, 1957, Ser. No. 680,861

8 Claims. (Cl. 137—43)

The present invention relates to a fluid sensing arrangement suitable for sensing the presence of absence of different fluids; for example, the presence of air as opposed to the presence of a liquid.

An object of the present invention is to provide a fluid signal or fluid sensing device which may be utilized to control a vent valve in an aircraft fuel system.

A further object of this invention is to provide a fluid sensing device of extreme simplicity, having no moving parts, and being of a minimum weight, for specific applications in the aircraft industry.

A more specific object of the present invention is to provide a device for sensing the presence of air as opposed to the presence of liquid fuel within a fuel tank, and to thereby actuate a vent valve within such tank.

In particular it is an object of the present invention to provide a fluid sensing device to control an aircraft fuel tank vent valve, such that the tank may be vented to the outer atmosphere but that liquid fuel may not normally pass overboard through said vent valve.

Figure 3:
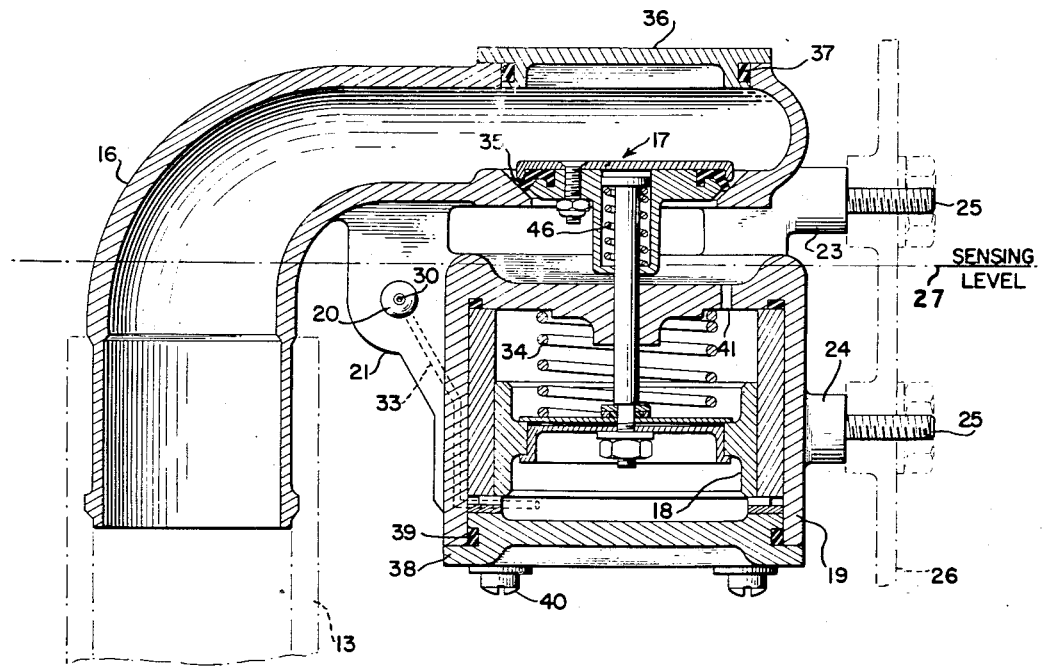
Figure 4:
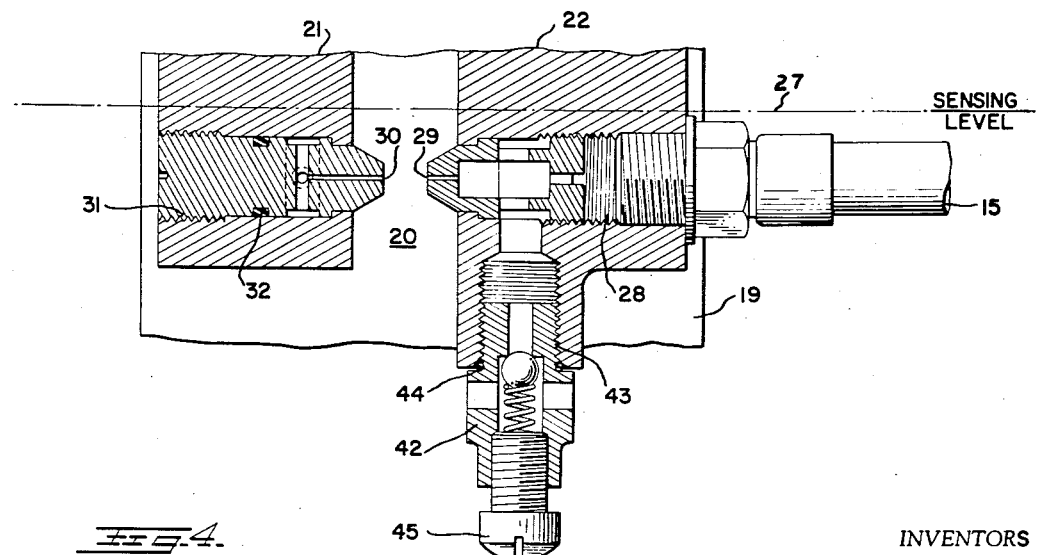

The foregoing objects, and additional features and benefits of the present invention will become apparent in the following detailed description of a preferred embodiment thereof, taken together with the accompanying drawings, wherein:

Figure 1 is a schematic representation, in elevation, of a fuel tank system incorporating the fluid sensing means of this invention to actuate vent valves within such tank, Figure 2 is an elevational view, almost entirely in section and to an enlarged scale, of one of the combined fluid sensing means and vent valves used in the fuel tank system of Figure 1, Figure 3 is a sectional view, to the same enlarged scale as Figure 2, of another of the fluid sensing and venting means shown in Figure 1, and Figure 4 is a fragmentary section taken along lines 4—4 of Figure 2 to a further enlarged scale, showing in detail the fluid sensing device of the present invention.

Referring to Figure 1, an aircraft fuel tank 10 has a fuel outlet line 11 and an air vent line 12. In prolongation of air vent line 12 a manifold 13 connects said line to a plurality of vent valves 2 and 3. Liquid fuel is admitted to the tank through a separate line, not shown, and in level flight attitude the "full tank" fuel level will be as indicated at line 14. Each of the vent valves 2, 3 include a fluid sensing device of the type of the present invention. Each such fluid sensing device is powered by a control air supply which is delivered via line 15 as shown schematically in Figure 1. The primary objective of the system of Figure 1 is to maintain one vent valve open regardless of the attitude of the aircraft with respect to level flight, and to prevent the passage of fuel overboard through the vent system.

Each of the vent valves 2, 3 are shown in greater detail in Figures 2 and 3, respectively. In general each such valve is basically similar in operation, and the two types differ only in certain operating structural details due to the locations they are designed to occupy within the fuel tank. The design of valve 3 makes it suitable for "top" mounting in a location normally wholly or partially elevated above the fuel level, whereas the valve 2 design is suitable for "bottom" mounting in a location normally submerged below the fuel level. These terms of location refer to the fuel tank position when the aircraft is in level flight as shown in Figure 1.

Each of the valves 2, 3 include a vent conduit or elbow 16 which connects to the manifold 13 and air vent line 12, a valve 17 of the poppet type, a valve actuator piston assembly 18 located within housing 19, and the fluid sensing means generally designated as 20 located between the two parallel spaced shoulders 21, 22.

As indicated by the cross-hatch lines of Figures 2–4, in a preferred embodiment, the elements 16, 19, 21 and 22 may be formed as an integral casting. Such casting includes bosses 23, 24 suitably taped to retain mounting studs 25. Such studs are utilized to fasten valves 2, 3 within the fuel tank 10 at predetermined locations on interior tank brackets 26 shown in phantom lines.

Referring now specifically to Figures 3 and 4, the line 27 represents the fluid sensing level. So long as the liquid fuel within tank 10 remains below such level valve 17 will be opened to provide venting means, but should the fuel rise above sensing level 27 then valve 17 must be closed. This mode of operation is achieved in the following manner.

Control air at a nominal pressure of 15.0 p.s.i.g. enters valve 3 and passes through a tapped passage 28 in shoulder 22 and is projected out of a transmitting orifice 29, which orifice is threadedly retained in passage 28. A receiving orifice 30 is threadedly retained in the tapped passage 31 in shoulder 21. Suitable sealing means, as indicated by packing 32, are provided to maintain an airtight system.

Receiving orifice 30 is located in axial alignment with transmitting orifice 29, and consequently receives control air at practically undiminished pressure and feeds such control air through passage 33 to the valve actuator piston 18 to cause the latter to raise poppet valve 17 from the position shown in Figure 3 a sufficient amount to permit vent air to escape into manifold 13.

However, should the liquid fuel rise above the sensing level 27 then the receiving orifice 30 will be submerged in the fuel, and the entire span between orifice 29 and orifice 30 will be full of liquid. Control air from the transmitting orifice will now dissipate its pressure in the form of bubbles in the liquid. Although a small amount of control signal air bubbles through to the receiving orifice, it will be at a pressure sufficiently reduced that it can no longer maintain puppet valve 17 open against the pressure of valve spring 34. Accordingly, valve 17 will snap shut thus preventing the passage of liquid fuel into manifold 13.

The poppet valve 17 and actuator piston assembly 18 are assembled within housing 19 in accordance with conventional practice to provide a workable air-actuated system. To this end a seal 35 is shown as part of valve 17; a top access cover 36 including packing 37 is provided; a bottom cover 38, including packing 39, is retained by cap screws 40; and an exhaust vent hole 41 is provided in the cylinder behind the face of piston 18.

A ball-and-spring relief valve 42 has been provided in a second threaded passage 43 located in shoulder 22 so as to be in communication with the incoming control air feed to the transmitting orifice 29. An O-ring packing 44 is included, and the relief valve actuating pressure may be adjusted by turning screw 45. Relief valve 42 has been included for the purpose of cancelling a major portion of any signal variation induced by changes in the control air supply pressure or the pressure in tank 10.

Basically, whenever the bleed air pressure input at line 15 exceeds the tank pressure by 5.0 p.s.i., relief valve 42 opens and prevents further increased differential from influencing the force available from the control air stream. When the valve is submerged in fuel it is desirable that the small amount of signal which bubbles through to the receiving orifice be kept to a controlled minimum. As tank pressure decreases, and/or control air pressure increases, an increasing amount of signal can be received at orifice 30 even though submerged which ultimately would move piston 18 to force poppet valve 17 open if allowed to increase without limit.

Valve 2, as shown in Figure 2, differs from the previously described valve of Figure 3 in internal structural details to make it suitable for mounting in a normally submerged location as indicated in Figure 1. For example, the receiving orifice 30a feeds the control air signal through a passage 33a to the upper face of a valve actuator piston assembly 18. The inverted poppet valve 17 is inserted into housing 19 through a modified top access cover 36a which includes a depending cage-like structure which provides the valve seat for valve 17. Also a modified bottom cover 38a includes the piston exhaust vent hole 41a.

In all other respects, including the mode of operation, the valve type shown in Figure 2 is the same as that previously described in connection with Figure 3. The section shown in Figure 4, used in describing the operation of Figure 3, is more properly associated with Figure 2 where such section was taken. However, since the two types are identical at this control air signal orifice area, only the one sectional figure thereof has been deemed necessary for a proper understanding of the invention.

It should be noted that vent relief valve springs 46 have been incorporated into the structure of poppet valves 17. Thus, the Figure 2 valve may open in a direction to permit flow from the line 12 to tank 10 whenever line pressure exceeds tank pressure beyond a predetermined value set by the spring 46 even though the valve might be submerged in fuel and therefore normally closed. In a similar manner the Figure 3 valve permits relief flow of fuel from tank 10 into line 12 even when submerged and normally closed, if the tank pressure becomes unduly high. In either case flow occurs only if inlet pressure exceeds outlet pressure by a predetermined tolerable maximum of 1.5 p.s.i. The primary objective of the system of Figure 1 remains as initially stated, namely to have one vent valve open at all flight attitudes, and to prevent the passage of solid fuel overboard.

We claim:

1. A liquid sensing device in combination with a liquid storing tank, the device being mounted within the tank and including a zone in which the presence of liquid is to be sensed, a source of control air at a predetermined pressure, a pressure sensitive air-actuated mechanism mounted within the tank by the control air to be controlled, an air line freely interconnecting said source and the sensing zone within the tank, and a second air line interconnecting said zone and the mechanism to be controlled, the sensitivity of said mechanism being such that when said zone is free of liquid the mechanism will be actuated, but when said zone has liquid therein the mechanism will not be actuated, the absence or presence of liquid in said zone being determined by the attitude of the tank and the level of the liquid therein.

2. A liquid sensing device in combination with a liquid storing tank, the device being mounted within the tank and comprising spaced transmitting and receiving orifices through which a supply of air under pressure may freely flow in the absence of liquid in the space between the orifices, and pressure sensitive means mounted within the tank and connected to said receiving orifice, the absence or presence of liquid in said zone being determined by the attitude of the tank and the level of the liquid therein and the condition of said pressure sensitive means being determined by the condition of said device.

3. A liquid sensing device in combination with a liquid storing tank, the device being mounted within the tank and including spaced upstream and downstream orifices, a supply of air under pressure connected to said upstream orifice, and pressure sensitive means mounted within the tank, and connected to said downstream orifice, said pressure sensitive means being actuated in different modes dependent on the presence or absence of fluid in the space between the orifices as determined by the attitude of the tank and the level of the liquid therein.

4. An air vent control system in combination with a liquid storing tank the system being mounted within the tank comprising a vent line connected to the interior of the tank, a pressure responsive valve connected to the vent line within the tank, a liquid sensing device including a pair of spaced, aligned orifices open to the interior of the tank, means to direct pressurized air to one of said orifices, and means to connect the other said orifice to the pressure responsive valve, said pressure responsive valve being actuated to open or close the vent line dependent on the absence or presence of liquid in the space between the orifices as determined by the attitude of the tank and the level of the liquid therein.

5. The invention according to claim 4 wherein a plurality of sensing devices controlling a plurality of pressure responsive valves connected to the vent line are located at different positions within the tank.

6. An air vent control system in combination with an aircraft liquid fuel tank the system being mounted within the tank comprising a vent line connected to the interior of the tank, a pressure responsive valve connected to the vent line within the tank, a liquid fuel sensing device including first and second spaced, aligned orifices open to the interior of the tank, means to direct pressurized air to the first orifice and means to connect the second orifice to the pressure responsive valve, said pressure responsive valve being actuated to open the vent line to the tank when pressurized air is transmitted from the first orifice into the second orifice and being actuated to close the vent line to the tank when the transmission of pressurized air between the first and second orifices is reduced by the presence of liquid fuel, the absence or presence of liquid fuel in the space between the two orifices being determined by the level of the fuel in the tank and the attitude in space of the tank.

7. The invention according to claim 6 wherein a plurality of sensing devices controlling a plurality of pressure responsive valves connected to the vent line are located at different positions within the tank.

8. A liquid sensing device in combination with a liquid storing tank, the device being mounted within the tank and including a zone in which the presence of liquid is to be sensed, a source of control air at a predetermined pressure, a pressure sensitive actuated mechanism mounted within the tank to be controlled by the control air, an air line freely interconnecting said source and the sensing zone within the tank, a second air line interconnecting said zone and the mechanism to be controlled, the sensitivity of said mechanism being such that when said zone is free of liquid the mechanism will be actuated, but when said zone has liquid therein, the mechanism will not be actuated, the absence or presence of liquid in said zone being determined by the attitude of the tank and the level of the liquid therein, and tank vent means interconnected with said tank, said sensing zone being located adjacent said tank vent means and said pressure sensitive actuated mechanism constituting a valve between the tank interior and said vent means.

References Cited in the file of this patent

UNITED STATES PATENTS

| | | |
|---|---|---|
| 792,540 | McCoy | June 13, 1905 |
| 968,677 | Moore | Aug. 10, 1910 |
| 2,333,044 | Rosch | Oct. 26, 1943 |
| 2,627,868 | Runnels | Feb. 10, 1953 |
| 2,774,365 | Stewart | Dec. 18, 1956 |
| 2,815,765 | Adelson | Dec. 10, 1957 |

UNITED STATES PATENT OFFICE
CERTIFICATION OF CORRECTION

Patent No. 2,966,160            December 27, 1960

Robert E. Forrester et al.

It is hereby certified that error appears in the above numbered patent requiring correction and that the said Letters Patent should read as corrected below.

Column 3, line 53, strike out "by the control air" and insert the same after "trolled" and before the comma, in line 54, same column 3.

Signed and sealed this 23rd day of May 1961.

(SEAL)
Attest:

ERNEST W. SWIDER            DAVID L. LADD
Attesting Officer            Commissioner of Patents